J. NEWTON.
MEASURING AND FILLING MACHINE.
APPLICATION FILED JULY 12, 1916.

1,262,380.

Patented Apr. 9, 1918.
4 SHEETS—SHEET 1.

Witnesses.

Inventor
James Newton
By
Attorney

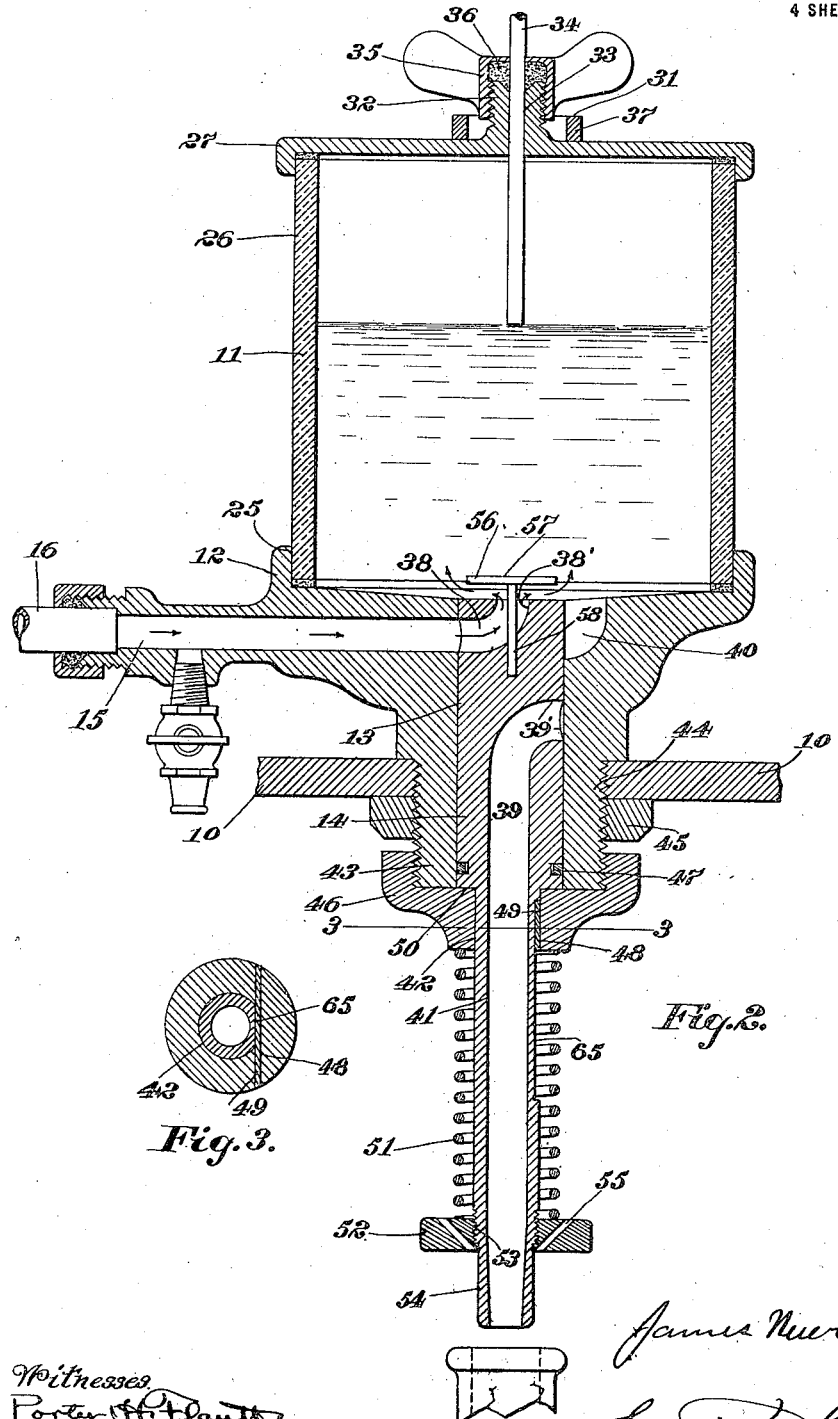

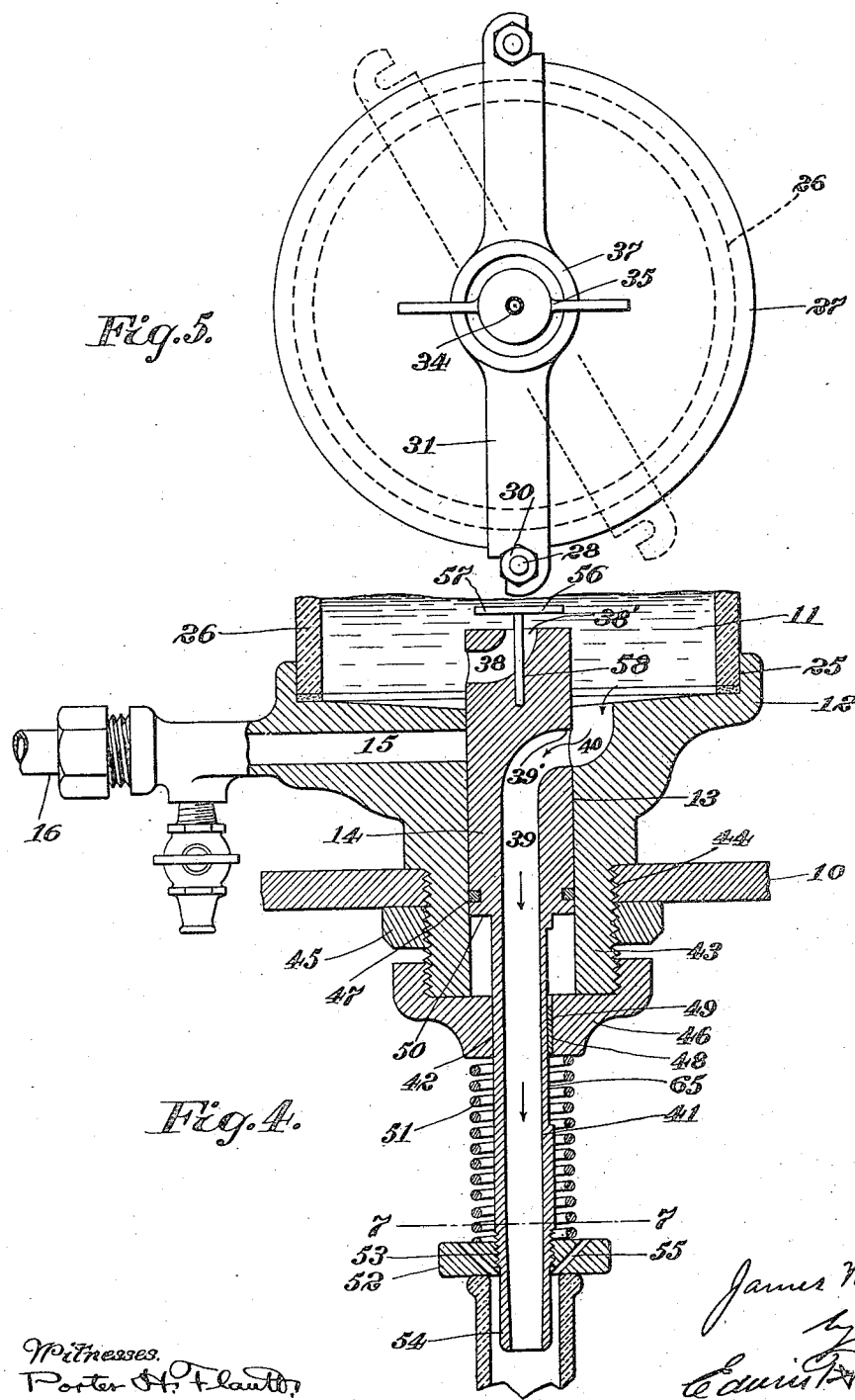

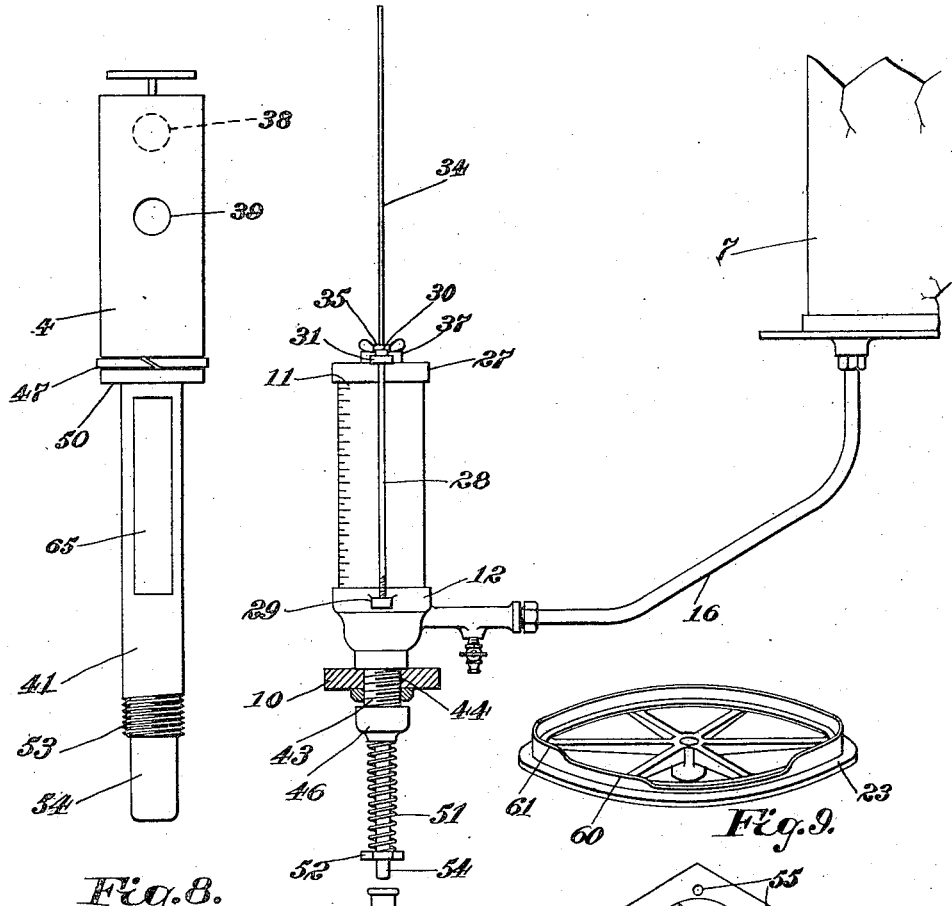

UNITED STATES PATENT OFFICE.

JAMES NEWTON, OF BALTIMORE, MARYLAND, ASSIGNOR, BY MESNE ASSIGNMENTS, TO JOHN L. WHITEHURST, OF BALTIMORE, MARYLAND.

MEASURING AND FILLING MACHINE.

1,262,380.   Specification of Letters Patent.   Patented Apr. 9, 1918.

Application filed July 12, 1916. Serial No. 108,789.

*To all whom it may concern:*

Be it known that I, JAMES NEWTON, a citizen of the United States of America, residing in the city of Baltimore, State of Maryland, have invented certain new and useful Improvements in Measuring and Filling Machines, of which the following is a specification.

This invention relates to a new and improved machine for measuring liquids and the like and filling bottles and other containers, as cans, with the measured fluid.

The object of the invention is, first to provide a machine for this purpose so constructed that the release of the measured liquid is accomplished by means of the bottle or container when in position to receive the measured charge so that if, by any chance, the bottles or other containers are not supplied to the machine with sufficient regularity or rapidity, the corresponding charge instead of being wasted will be held in the machine until the container is supplied to receive it, and to do this by means of a single valve.

Another object of the invention is to provide means for breaking up the swirl of the charge as it enters the measuring chamber and thereby increase the accuracy of the measurement by preventing the liquid from piling up at the sides through the action of the rotary currents established by the inflow of the fluid in the measuring chamber.

Still another object of the invention is to provide two motions of the part which engages the bottle or moves it to filling position whereby the bottle is lightly engaged and held or centered before it is rigidly clamped for filling. This prevents injury to the bottles, etc., which results from clamping when the filling nozzle is out of alinement with the opening, and loss of the liquid.

Other objects of the invention will be brought out in the specification and claims.

In the accompanying drawings, I have illustrated a machine embodying the features of my invention.

Fig. 2 is a similar section through one filling chamber showing the valve and the connections, also in central section;

Fig. 3 is a section on the line 3, 3 of Fig. 2;

Fig. 4 is a section similar to Fig. 2 with the top of the chamber broken away showing the valve in a different position, the delivery from the chamber to the bottle being open in Fig. 4 and the inlet to the measuring chamber being open in Fig. 2;

Fig. 5 is a plan showing the top of the cover of a measuring chamber and the fastening means therefor;

Fig. 6 is a view showing one measuring chamber, the connection to the supply chamber, the bottle in the position which it occupies when it is first put on the machine before the centering operation, the bottle support and the cam follower in elevation, and the adjacent portions of the machine in section;

Fig. 7 is a section on the line 7, 7 of Fig. 4 looking downward showing a portion of the spring and the nut on the end of the delivery tube;

Fig. 8 is an enlarged view of the valve and tube; and

Fig. 9 is a perspective view of the bottle-clamping cam.

Figure 1:
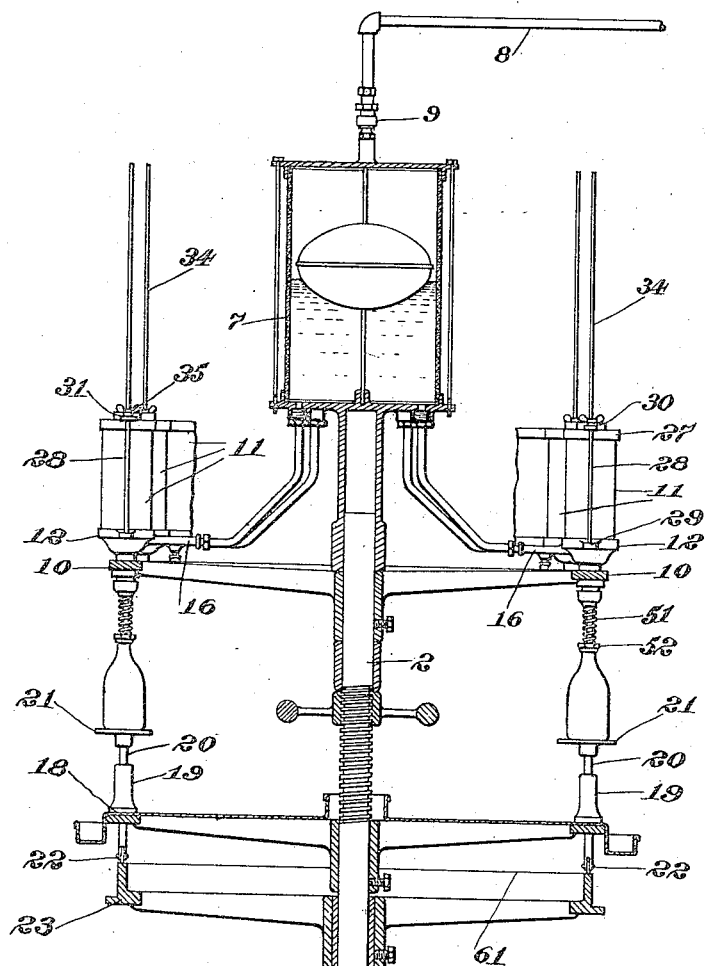
Figure 1 is a vertical, central section through the machine.

Referring to the drawings by numerals, the machine consists of a stand or support 1, carrying a rotary vertical shaft 2, shown as having suitable bearings, a thrust bearing at the bottom 3 and suitable journal bearings 4. This shaft, in the form of the invention shown, has secured to it, a worm wheel 5 driven by a worm 6 operated from a suitable source of power. The vertical shaft carries near its upper end a supply tank 7, shown as rotary, which may be fed by a pipe 8 from any suitable source, preferably connected to the tank by a swivel fitting 9. Just below the tank is a horizontal, circular bracket 10 secured to the shaft, rotating therewith and carrying a convenient number of measuring chambers 11.

These chambers, in the form of the invention shown, see particularly Fig. 2, consist of a metal base 12 having a vertical bore or valve chamber 13 containing a single inlet and delivery valve 14. The base of each measuring chamber has an inlet or supply passage 15 leading to the valve chamber 13 and connected to the supply tank 7 by means of a pipe 16. Beneath the circular bracket 10 and also secured to the vertical shaft 2 is a rotating table 18 in which at intervals along the circumference are seated a series of guides 19 in which slide the upright rods 20 carrying bottle supports 21 equal in number to the measuring chambers 11. Each of these rods 20 is provided at its lower end with a rotating cam follower 22 which engages and follows the path of a circular cam 23 secured to the base or support 1.

The filling chambers 11, as shown herein, consist each of a base 12 having a circular seat or socket 25, a glass cylinder 26 seated in the socket, a cover 27 for the cylinder, upright rods 28 at each side of the cylinder, screw-threaded and seated at their lower ends in correspondingly apertured and threaded apertures in ears 29 on the base and at their upper ends provided with nuts 30 just above the top surface of the cover 27. The rod at each side is engaged, in the form of the invention shown, by a transverse pivoted plate or fastening bar 31 having at its ends, oppositely disposed hooks which receive the rods 28, the plate bearing at each end against one of the nuts 30. Near its center, the cover 27, in the form shown, has an upright boss 32 apertured centrally at 33 to receive an air tube 34 open at both ends and adjustable through the boss 32, the boss being threaded and engaged by a packing nut 35 having a chamber 36 for the packing which prevents leakage around the tube 34. The plate 31 is formed centrally into a ring 37 which takes over or encircles the boss. The charge is regulated by setting the lower end of the tube 34 at the height to which the chamber must be filled with liquid to give the desired volume which is to be put in each bottle. Leakage is prevented by tightening the packing nut 35 and the nuts 30.

An important feature of the invention consists in the cylindrical valve 14 seated in the chamber 13 and provided with two ports, 38 for supplying liquid to the measuring chamber and 39 for delivering the liquid from the measuring chamber to the bottle or other receptacle to be filled so that a single valve serves both of the functions of filling the chamber and leading the liquid from the chamber to the bottle. To this end, the base 12 is provided with the supply passage 15 already referred to, with which the inlet or measuring port 38 registers normally i. e. in the measuring position of the valve shown in Fig. 2, and an outlet or delivery passage 40 which registers with the filling port or valve passage 39, in the filling position of the parts shown in Fig. 4.

In the form of the invention shown, the measuring port or package 38 has its delivery end 38' in the head or upper end of the cylinder valve 14 which is exposed to the liquid in the measuring chamber 11. The port 39 has its inlet end 39' in the side of the valve and is continued below the valve proper in the form of a delivery tube 41 which extends downward through an opening 42 in a cap or collar 46 on the lower end of the neck 43 of the base 12. This neck serves the function of securing the base to the rotary table or bracket 10. This table is apertured at 44 and the apertures are threaded to receive and engage the threaded neck 43 which is in turn held in position by a lock nut 45. To prevent leakage, the valve, as shown, is provided with a packing ring 47 which bears against the face of the cylindrical chamber 13 and to prevent rotation of the valve and consequent failure of the passages and ports to register, the tube 41 is in effect keyed in the opening or passage 42 in the collar 46, this, in the present instance, being accomplished by providing a flat face 65 on the tube, cutting a slot 48, see particularly Fig. 3, in the collar 46, preferably having the outer surface of the slot tangent to the opening 42 and inserting in the slot a flat plate 49 which bears on the flat surface 65 and prevents rotation of the valve and tube.

In the operation of the machine, the valve 14 is held normally in position with the inlet or measuring port 38 open and the outlet or filling port 39 closed, that is, it tends to move downward in response to the pressure of the spring 51, to normal position with the bottom or bottom end surface 50 of the cylinder seated on the top surface of the cap 46, the spring 51 being so placed that it bears at its upper end against the bottom face of the cap 46, and at its bottom end against a nut or apertured and threaded plate 52 which engages a thread at 53 near the lower end of the tube but spaced up from said lower end a sufficient distance to provide a nipple or nozzle 54 to be inserted in the bottle neck or opening of the receptacle to be filled and to form, as well as a bottom abutment for the spring, a stop to limit the insertion of the tube in the bottle or other opening. This plate or nut 52 is, as shown, preferably provided with openings or air vents 55 which may be inclined upward and outward at their upper ends.

To prevent swirling of the liquid and consequent inaccuracy of the measurement, a shield 56 has been provided in the form of a disk 57 supported on an upright 58 on the upper end of the valve 14, spaced upward above the opening 38 a sufficient distance to permit free exit of the fluid but covering this opening sufficiently to break the jet or stream and prevent formation of whirlpools or eddy currents throwing the liquid to the sides as a result of centrifugal force.

The cam 23 coöperating with the followers 22 carried on the lower ends of the sliding rods 20 of the bottle supports 21, has been described. This cam, in the preferred form of the invention, consists of a circular track with two steps or rises 60 and 61, see Fig. 9, corresponding to the centering and clamping positions referred to, so that the bottle is first centered and then clamped or held in filling position, as hereinafter described.

To prepare the machine for operation, the tube 34 is adjusted at its lower end to a level up to which each chamber 11 must be filled to give the predetermined filling charge. The chamber 11 being completely air-tight, the liquid cannot enter after the vent is closed by the liquid for the air backed up in the top of the chamber will overcome and balance the pressure at which the liquid is fed, and at any uniform pressure, the flow will stop at a predetermined uniform, and ordinarily, a very slight distance above the end of the tube. The passages 15 connecting the measuring chambers to the supply chamber 7 are normally open, the normal position of the valve 14 being, as shown in Fig. 2, with the measuring port 38 in registration with the supply passage 15, so that the supply passage is open to the measuring chamber. But the valve is mounted to slide vertically in the chamber 13, the tube 41 sliding back and forth through the guiding opening or passage 42 in the cap 46, restrained from rotation by the flat plate 48 bearing on the flat surface 65. When the bottle or receptacle to be filled is brought into filling position, the nozzle 54 entering the opening in the bottle and the plate 52 bearing against the lips of the opening, the valve 14 is moved upward by the pressure of the bottle against the plate 52, compressing the spring 51, first closing the inlet passage 15 and then, after this is fully closed, bringing the port 39 into registration with the delivery opening 40 so that the measuring chamber is emptied through the delivery opening and the inlet passage 15 is closed so that no liquid enters the measuring chamber during the delivery of the measured charge of liquid to the bottle or other receptacle. This gives absolutely accurate and uniform measurement of the charge.

The operation by which the centering, clamping of the bottle, the closing of the inlet passage to the measuring chamber and the opening of the delivery passage, are accomplished is performed by means of a cam 23 coöperating with the follower 22 and the sliding rod 20 and the bottle support 21.

The bottles are supplied to the machine by an attendant or this may be arranged by an automatic conveyer. In either case, they are placed on the supports 21 at a point shortly before the rollers 22 come in contact with the first or centering step 60 of the cam. The attendant or feeding device keeps control of the bottle until it is lifted by the action of the step 60 bringing the nozzle or nipple 54 into the opening of the bottle neck or opening of whatever container is used. The tension of the spring at this point is so slight that the bottle, if not accurately placed, is easily moved and centered before the second step of the cam, which raises the bottle until it is pressed tightly against the stopping plate 52, is reached.

In the latter or third position of the bottle, the port 39 is in registration with the filling passage 40 and the liquid in the measuring chamber 11 is transferred to the bottle or container, the inlet passage 15 being closed by the valve 13, the measuring port 38 being thrown out of registration by the raising of the valve. This, as has already been pointed out, gives absolute accuracy of measurement with a single valve in the manner of operation just described, using the bottle as a means for operating the valve to open and close the filling and measuring passages, and prevents absolutely the loss of the liquid being handled because of failure to supply the containers in regular order. Aside from these advantages, the simplicity of this arrangement and the facility with which it is embodied in a commercial form, are important features.

I have thus described my invention specifically and in detail in order that its nature and operation may be fully understood; however, the specific terms herein are used descriptively rather than in their limiting sense and the scope of the invention is defined in the claims.

I claim:

1. In a filling and measuring machine, a supply chamber, an external measuring chamber, a valve chamber, a supply passage and a delivery passage communicating with the valve chamber, a valve mounted to slide in the valve chamber, having separate measuring and filling passages and ports adapted to register with the supply passage and the delivery passage respectively, means tending to keep the valve in position with the measuring port in registration with the supply passage, a nozzle rigidly connected to the valve forming an extension of the delivery passages of the valve and adapted to enter the opening in the container, an abutment adjacent the nozzle and rigidly connected to the valve to be engaged by the container, and means for moving the container into filling position causing it to engage said abutment, operating the valve, thereby closing the supply passage and opening the delivery passage.

2. In a filling and measuring machine, a supply chamber, a measuring chamber externally placed in regard to said supply chamber, a valve chamber and a supply passage connected to the supply chamber, and a delivery passage communicating with the valve chamber, a valve mounted to slide in the valve chamber having measuring and filling ports adapted to register with the supply passage and the delivery passage respectively, a filling nozzle connected to the delivery port of the valve and adapted to enter the opening in the container, a spring tending to hold the valve in position with the measuring port in registration with the inlet passage, an abutment on the nozzle formed to be engaged by the container, and means for moving the container into filling position causing it to engage the abutment and operate the valve bringing the filling port into registration with the delivery passage.

3. In a filling and measuring machine, a supply chamber, a measuring chamber externally placed regarding said supply chamber, a valve chamber in communication with the measuring chamber, a plug valve sliding in the valve chamber, a supply passage leading from said supply chamber and a delivery passage, both said passages communicating with the valve chamber, measuring and delivering ports in the valve chamber, alternately in registration with the supply and delivery passages to admit liquid to the measuring chamber in one position of the valve, and to lead it from the measuring chamber to the receptacle in the other position of the valve, means tending to maintain the valve in position with the measuring port in registration with the supply passage, a nozzle to be engaged by the container, the nozzle being connected by a passage to the delivery port and rigidly connected to the valve, means on the nozzle to be engaged by the container to operate the valve, and means for thrusting the container into filling relation with the nozzle whereby the valve is operated, moving the delivery port into registration with the delivery passage and the measuring port out of registration with the supply passage, opening the former and closing the latter.

4. In a machine for filling containers with liquid, and measuring and equalizing the charges, a rotating table, a supply chamber, a series of measuring chambers outside the supply chamber, connected thereto and carried by the table, a valve chamber at the bottom of each measuring chamber, an inlet passage leading to the valve chamber from without and a delivery passage leading from the measuring chamber to the valve chamber, a valve in the chamber having measuring and delivery ports to register alternately with the supply and delivery passages respectively, a tube forming an extension of the valve and connected to the delivery passage, a nozzle at the end of the tube, the lower part of the measuring chamber being apertured to form a guide and slide bearing for the tube, a spring tending to maintain the valve in position with the measuring port in registration with the supply passage, an abutment on the nozzle to be engaged by the container when the nozzle is inserted in the opening in the container, means in the machine operated by the rotary motion of the table for clamping the container in filling position, the clamping motion causing the container to engage the abutment on the delivery nozzle and operate the valve, moving the measuring port out of registration with the supply passage and bringing the delivery port into registration with the delivery passage.

5. In a machine for measuring liquids and delivering a uniform charge of liquid to each of a series of containers, a series of measuring chambers with inlet and delivery passages and means for controlling the same, a rotating table carrying the measuring chambers, means for carrying the containers in a path beneath the measuring chambers, means for bringing each container into filling relation with the delivery passage of the corresponding measuring chamber, consisting of a cam having a path underlying the path of the containers with a follower for each measuring chamber, and means communicating the motion of the follower to the corresponding container, the cam having a lower flat portion and two steps leading from the lower portion to the higher part of the cam, the two steps serving first to lightly engage or center the container, bringing it lightly into engagement with the delivery passage, and second, to clamp it into close engagement with the delivery passage of the corresponding measuring chamber.

Signed by me at Baltimore, Maryland, this 12 day of June, 1916.

JAMES NEWTON.

Witnesses:
ZELLA KUHN,
JOHN E. CROSS.

Copies of this patent may be obtained for five cents each, by addressing the "Commissioner of Patents, Washington, D. C."